United States Patent
Sangala et al.

(10) Patent No.: US 11,106,891 B2
(45) Date of Patent: Aug. 31, 2021

(54) AUTOMATED SIGNATURE EXTRACTION AND VERIFICATION

(71) Applicant: MORGAN STANLEY SERVICES GROUP INC., New York, NY (US)

(72) Inventors: Sruthi Sangala, Harrison, NJ (US); Titash Mandal, Brooklyn, NY (US); Sonil Trivedi, Jersey City, NJ (US); Sujit Eapen, Plainsboro, NJ (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 137 days.

(21) Appl. No.: 16/565,133

(22) Filed: Sep. 9, 2019

(65) Prior Publication Data

US 2021/0073514 A1    Mar. 11, 2021

(51) Int. Cl.
*G06K 9/00* (2006.01)
*G06K 9/62* (2006.01)
*G06N 3/08* (2006.01)

(52) U.S. Cl.
CPC ..... *G06K 9/00174* (2013.01); *G06K 9/00181* (2013.01); *G06K 9/6202* (2013.01); *G06K 9/6215* (2013.01); *G06K 9/6267* (2013.01); *G06N 3/08* (2013.01)

(58) Field of Classification Search
CPC ............. G06K 9/00174; G06K 9/6267; G06K 9/00181; G06K 9/6215; G06K 9/6202; G06N 3/08
See application file for complete search history.

(56) References Cited

U.S. PATENT DOCUMENTS

| | | | |
|---|---|---|---|
| 9,058,512 B1* | 6/2015 | Medina, III | G06K 9/00161 |
| 10,140,510 B2 | 11/2018 | Shustorovich et al. | |
| 2003/0233557 A1* | 12/2003 | Zimmerman | G06K 9/00154 713/186 |
| 2004/0076344 A1* | 4/2004 | Albertelli | G06K 9/00463 382/305 |
| 2006/0088194 A1* | 4/2006 | Lee | G06K 9/00154 382/119 |
| 2007/0092140 A1* | 4/2007 | Handley | G06K 9/00456 382/176 |
| 2008/0112593 A1* | 5/2008 | Ratner | G06K 9/469 382/103 |

(Continued)

*Primary Examiner* — Ming Y Hon
(74) *Attorney, Agent, or Firm* — Weitzman Law Offices, LLC

(57) ABSTRACT

A system for extraction and verification of handwritten signatures from arbitrary documents. The system comprises one or more computing devices configured to: receive a digital image of a document; remove a subset of words from the digital image identified via OCR; determine a plurality of regions of connected markings that remain in the digital image; based at least in part on a pixel density or proximity to an anchor substring of each region, determine that a region contains a handwritten signature; extract first image data of the region containing a handwritten signature from the digital image; retrieve second image data of a confirmed example signature for a purported signer of the handwritten signature; and based on a comparison of the first image data with the second image data, forward a determination of whether the first image data and second image data are similar.

20 Claims, 7 Drawing Sheets

(56) References Cited

U.S. PATENT DOCUMENTS

| | | | |
|---|---|---|---|
| 2008/0118151 A1* | 5/2008 | Bouguet | G06F 16/5838 |
| | | | 382/181 |
| 2010/0296719 A1* | 11/2010 | Williamson | G07D 7/12 |
| | | | 382/137 |
| 2011/0007366 A1 | 1/2011 | Sarkar et al. | |
| 2011/0007964 A1 | 1/2011 | Saund et al. | |
| 2011/0249299 A1* | 10/2011 | Wu | G06K 9/40 |
| | | | 358/3.26 |
| 2012/0183211 A1* | 7/2012 | Hsu | G06K 9/00449 |
| | | | 382/164 |
| 2013/0114890 A1 | 5/2013 | Saund | |
| 2015/0341370 A1* | 11/2015 | Khan | H04L 63/0861 |
| | | | 726/30 |
| 2016/0063321 A1* | 3/2016 | Reese | G06T 7/70 |
| | | | 382/187 |
| 2016/0210453 A1* | 7/2016 | Seo | G06F 21/36 |
| 2017/0154213 A1* | 6/2017 | Chu | G06K 9/6202 |
| 2017/0161876 A1* | 6/2017 | Carr | G06N 3/08 |
| 2018/0196924 A1* | 7/2018 | Assefa | A61B 5/02 |
| 2018/0247108 A1* | 8/2018 | Hong | G06K 9/00416 |
| 2018/0329506 A1* | 11/2018 | Liang | G06F 3/038 |
| 2019/0006027 A1* | 1/2019 | Sacaleanu | G16H 50/30 |
| 2019/0026551 A1* | 1/2019 | Banerjee | G01R 13/02 |
| 2019/0069007 A1* | 2/2019 | Bodas | H04N 21/440236 |

* cited by examiner

AUTOMATED SIGNATURE EXTRACTION AND VERIFICATION

FIELD OF INVENTION

This application relates to software systems for user authentication, and more specifically, an automated system for extracting a signature from a signed document and verifying that the signature was actually made by a person identified by the document.

BACKGROUND

Many businesses and government agencies use a variety of paper forms that require a signature by a person filling out the form in order to be valid. In some circumstances, documents sent to the business or agency by a customer or other stakeholder may even be in a format defined by the customer or stakeholder, rather than one under the business or agency's control. For example, a seller of property may generate a deed of sale on their own computing device, print it out, sign it, and expect the deed to be recorded by a county register, or a contractor may generate invoices to be signed and submitted to a business for payment.

When a signature must be verified to ensure that the stakeholder who purportedly signed a document actually signed the document, a human service representative may be tasked with pulling up a signature card recording a master copy of the stakeholder's signature, or with retrieving multiple examples of documents known to have been signed by the stakeholder in the past. The human representative will then visually compare the signatures, a process prone to error if done hastily, and costing valuable time otherwise.

Due to the sheer number of forms a business or agency may presently use or have used variation of in the past, and the unpredictability of forms that may be received in the future, it may be impossible to know a priori where the signature will be on an arbitrary document, and therefore impossible for a naïve algorithm to extract a region containing a signature to pass on to verification software without analyzing the document itself. Even with a human reviewer, it can take unnecessary extra seconds for each document to glance through multiple pages and identify every instance of a signature.

Even if a region of a document that exclusively contains the signature can be extracted, current verification algorithms are insufficiently flexible and are error-prone, as signatures have variance every time and no two instances of a person's signature will have identical lengths and angles of every pen stroke, and there will be significant differences when two images are compared on a pixel-by-pixel basis.

As a result of all of the above issues, businesses or agencies dealing with a variety of forms signed by numerous stakeholders are unable to easily shift signature verification tasks currently assigned to human employees to automated systems.

SUMMARY OF THE INVENTION

A computer-implemented method for handwritten signature extraction is disclosed. The method comprises receiving a digital image of a document comprising a handwritten signature; removing a subset of words from the digital image identified via optical character recognition; determining a plurality of regions of connected markings that remain in the digital image; based at least in part on a pixel density or a proximity to an anchor substring of each of the plurality of regions, determining that one or more regions of the plurality of regions each contain a handwritten signature; and extracting image data of the one or more regions, each containing a handwritten signature, from the digital image.

Another computer-implemented method for handwritten signature verification is also disclosed, comprising receiving first image data comprising a purported signature of an individual; retrieving second image data comprising a known signature of an individual; creating a feature vector that incorporates a plurality of similarity metrics between the first and second image data; and passing the feature vector to a linear regression model to estimate a likelihood that that the first image data and second image data represent similarity between the image pair.

A system for performing both of the methods above sequentially is also disclosed, comprising one or more processors executing instructions that cause the one or more processors to extract a signature from an arbitrary document according to the first method and verify the signature according to the second method.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

FIGS. 3A-3F depict a sample document at different stages of a signature recognition process according to methods disclosed herein;

DETAILED DESCRIPTION

In order to address the issues described above, a fully or partially automated system may obtain a digital image of a document containing a signature, perform a series of transformations and analyses of the image data, isolate a region of the document that contains only the signature, pass the extracted region of the image containing the signature to a verification module, and determine its similarity to the other signature.

Figure 1:
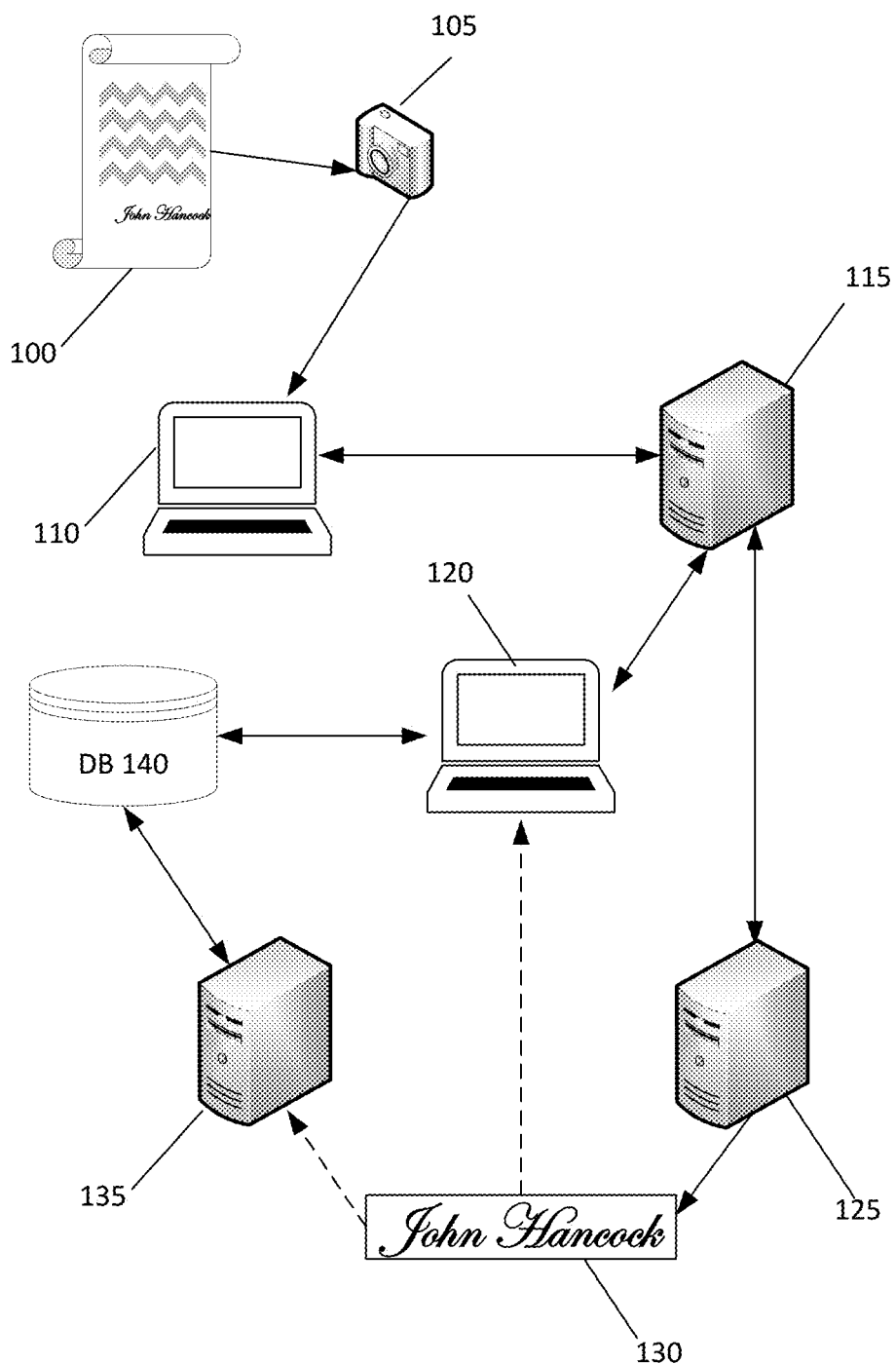
FIG. 1 depicts a system of computing devices for capturing, transmitting, extracting, and verifying a handwritten signature on a document against one or more stored examples of a human user's handwriting according to methods disclosed herein.

FIG. 1 depicts a system of computing devices for capturing, transmitting, extracting, and verifying a handwritten signature on a document against another signature extracted from a similar document referred in the system as a signature card.

A physical document 100 comprising a handwritten signature in ink (or another pigment or marking device) on paper (or another substrate) may be placed before scanner or other device 105 to be scanned, photographed, or otherwise digitized. In some alternate embodiments, document 100 may be a digital document, such as a PDF (portable document format) or bitmap that has been "signed" via a user physically manipulating a mouse, stylus, touchscreen, or other input device to translate movements of the user's hand into an additional graphical element added to the digital document, approximating what the user's handwritten physical signature would be.

The scan of physical document 100 (or the file of digital document 100) is at least temporarily stored on user computing device 110 before transmission to user interface server 115. User computing device 110 may comprise scanner 105 (for example, a camera in a mobile phone), be communicatively coupled to the scanner 105 (for example, connected to a dedicated scanner/photocopier via a wireless connection or USB [universal serial bus] cable), or simply receive a file that has been previously scanned by scanner 105 at a previous time or remote location.

User interface server 115 may, in some embodiments, have prompted a user of user computing device 110 to send the scanned document (such as, for example, a web page interface prompting a user to upload a document for processing). In other embodiments, user interface server 115 may receive the file passively, such as via an email communication from the user or by operating FTP (file transfer protocol) server software to receive arbitrary files at any time. A user interface generated by user interface server 115 may be used not only by the user to upload the scanned document but also by a customer service representative, using customer service computing device 120, to act upon instructions or information in the document once it is verified as genuinely signed.

User interface server 115 may forward the scanned document to an extraction server 125, containing software to identify a region of the scanned document containing the handwritten signature, according to a method described below in the paragraphs accompanying FIG. 2. The identified image part 130 may be sent, in some embodiments, to a verification server 135 for automatic verification of the signature, while in other embodiments, the identified image part may be sent, directly or via user interface server 115, to customer service computing device 120 for a human user to perform the verification by sight and personal judgment call.

In some embodiments, the extracted image part 130 may be accompanied by the full document or by some subset of information gleaned from the document, such as an identification of the purported signer, so that the verification server 135 or customer service representative using device 120 may know whose signature is to be compared to the extracted signature in the image 125.

When verification server performs the verification, a method described further below (in paragraphs accompanying FIG. 4) is used to automatically compare the extracted signature 130 to one or more signatures retrieved from a database 140. If a customer service representative is performing the verification, one or more example signatures may be forwarded to an interface on customer service computing device 120, or the customer service representative may consult a physical signature card.

Although a system is described here in which five computing devices 110, 115, 120, 125, 135, and 140 are treated as separate computing devices, other configurations are possible in which additional devices are added (dividing between them the functionality ascribed to a single device) or devices are removed (and in which a single general purpose computer performs multiple functionalities described throughout the paragraphs above and below).

For example, a single computer operated by a customer service representative may have all the functionality to receive, extract, and verify a signature, so that it acts as devices 115, 120, 125, 135, and 140 with no transmission of information between devices, only passing of information between different software modules in the same device.

Figure 2:
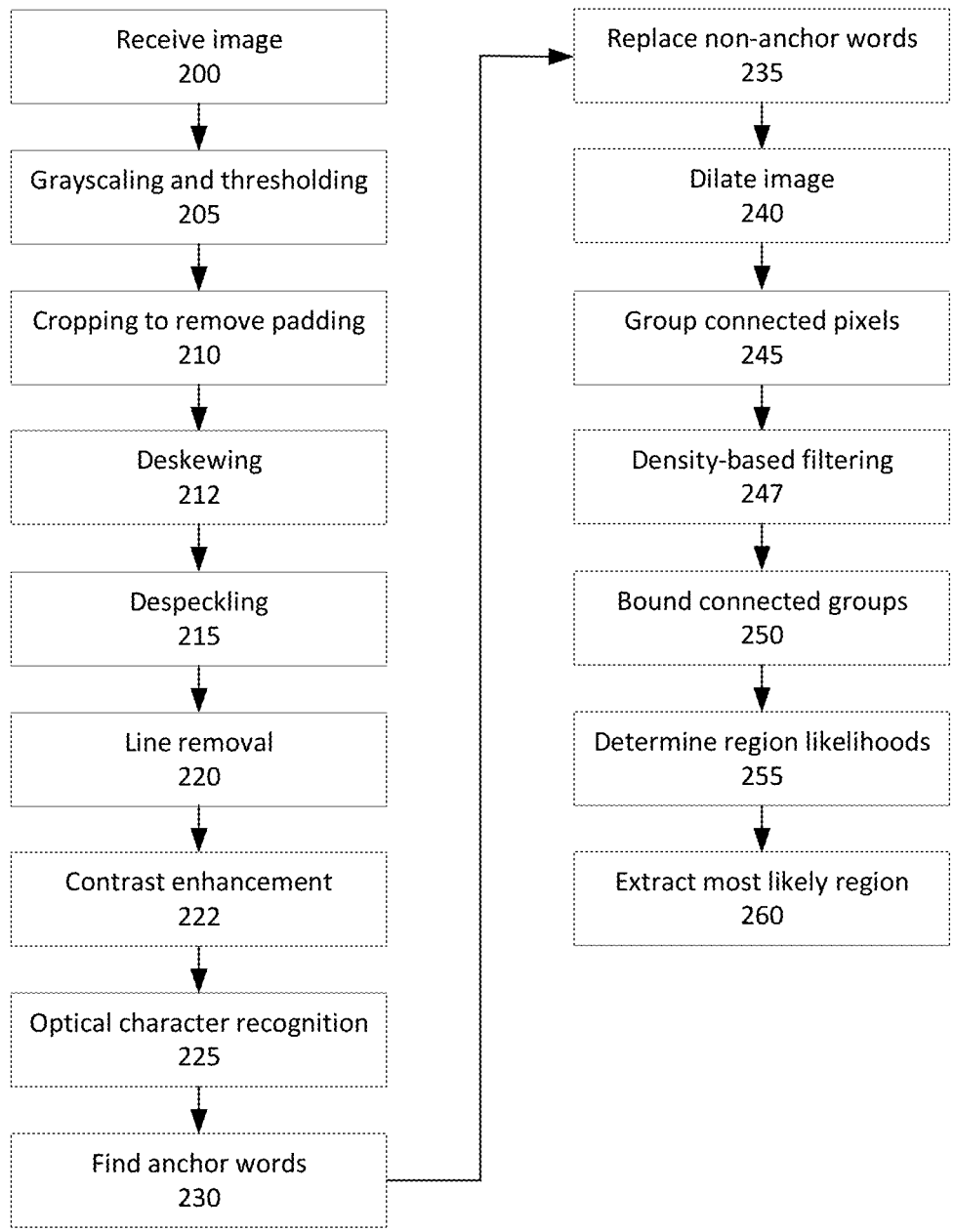
FIG. 2 depicts a method of extracting a signature from a document according to methods disclosed herein.

FIG. 2 depicts a method of extracting a signature from a document according to methods disclosed herein.

Initially, the system receives the image data of a document 100 that has been captured by the scanner/camera 105 (Step 200). Although the following steps assume that raw optical data is received without the scanner/camera having done any processing to clean up the image file, it is not necessary that the raw image be provided rather than an image that has undergone some cleanup performed automatically by devices 105 or 110.

Next, the image is converted to grayscale and then undergoes Otsu thresholding and image inversion (Step 205), resulting in an image where every pixel is either pure white or pure black, based on its comparative lightness or darkness to the rest of the image prior to processing. In other embodiments, a thresholding algorithm other than Otsu's method that results in image binarization may be used. The image is inverted in order to treat foreground (printed) characters as ones in any array rather than zeroes for mathematical purposes, but the methods described below could theoretically be modified to work whether the image is inverted or not.

Optionally, the image is automatically cropped at the edges to produce the smallest image that still contains all foreground pixels or the substantial totality of them (Step 210).

The image may also undergo deskewing (Step 212) to rotate the entire image or portions thereof, compensating for a document that was entered into a scanner askew, printed at an angle to the underlying paper or substrate, or otherwise caused to have its contents non-horizontal within the captured image.

Next, the image is de-speckled using fast non-local image denoising (Step 215) to remove any foreground pixels that were spuriously picked up during the optical capture by the scanner and that survived the thresholding process, but were not actually printed or written matter on the page.

Next, horizontal and vertical lines may be removed via a convolution matrix kernel (Step 220) selected such that foreground pixels with a number of foreground pixels directly above, below, or to the left or right are replaced with background pixels, but pixels that are not a part of a horizontal or vertical line are retained.

As a final preprocessing step to maximize the suitability of the image for optical character recognition (OCR), the image contrast may be increased (Step 222) if the image is not already binarized to maximize the contrast.

Next, the image undergoes OCR (Step 225) to identify as many regions of printed text as possible, storing coordinates of a minimal bounding box around the text and confidence level of word identification for each region.

The set of identified words and characters is searched for any that are "anchor words" or substrings of anchor words (Step 230). Anchor words indicate the likely presence of a nearby signature and may include, for example, "signature", "signed", "affixed", etc., and their equivalents in other languages. Identification of substrings is preferred in case a signature passes through a nearby anchor word and interferes with the ability of the OCR process to capture the full word.

For all words or substrings that are confidently identified and are not anchor words or substrings of anchor words, the regions containing those identified are replaced fully with background pixels (Step 235). At the same time, any printed handwritten characters that are sufficiently neat and identifiable as to be picked up by OCR are also whited out and replaced with background pixels, as they are unlikely to be part of a signature if printed.

Next, the image is again processed using a convolution matrix to "dilate" the image (Step 240), smudging each pixel slightly in the vertical and horizontal directions (a cross-shape of positive values in the kernel for processing).

After dilation, regions of connected pixels are identified and grouped (Step 245) by recursively starting at any given foreground pixel and adding any of its eight neighbors that is also a foreground pixel to the group, and then their neighbors, and so on.

In some embodiments, regions of connected pixels may be filtered out from consideration based on a high pixel density (Step 247) in the area of the connected pixels, as extremely unlikely to contain a signature (see further discussion below, regarding Step 255).

For each connected group, a minimal bounding box is drawn around the group and stored in memory (Step 250). Multiple bounding boxes may be consolidated into a single bounding box if, for example, they overlap, or share Y-coordinates (and are likely to be on a same line of text) while being closer in the X-direction than a predetermined threshold.

Within each of these bounding boxes, one or more methods of determining whether the contents are a signature may be applied (Step 255), as described below.

First, the overall density of foreground pixels within the bounding box may be measured and compared to other bounding boxes. Printed text tends to delineate more neatly into horizontal lines of completely white space above and below lines of dense printing, where neither capital letters nor descenders tend to encroach much into that white space, signatures tend to be made of thin pen strokes that have much greater vertical range, causing a bounding box that contains the entire signature to contain much more white space than a bounding box containing a typeface.

Second, the relative or absolute dimensions of the bounding box may be taken into account. A typewritten or even a printed handwritten word will in many cases fit into a bounding box that is much longer than it is tall, and if it is short enough to have a small aspect ratio, is unlikely to be a signature, which tends to have a minimum length. A bounding box for a signature is also likely to be taller than those of printed text in a smaller font, and longer than the average typewritten word in the document.

Third, the proximity of each bounding box to the previously identified anchor words or substring is factored into the determination. A signature is much more likely to be immediately next to, above, or below an anchor that is prompting the signer where to sign the document, or at least on a same level (if, for example, a person signs in the middle or at the right edge of a long signature line having the "Signature" anchor at the far left).

Fourth, a machine learning algorithm may be trained to take in binarized images as vectors and return a likelihood that they represent a signature. In a preferred embodiment, the machine learning technique may be a convolutional neural net into which is fed a series of subsections of the image as bit vectors. In a preferred embodiment a multi-class classifier can be trained to differentiate between different classes, such as typewritten words, numbers, handwritten printed text, and/or handwritten signatures, to determine a relative confidence in classification as a signature compared to classification as another kind of information.

Based on these factors, an overall confidence level or likelihood that a bounding box contains a signature may be determined, and in a signed document, a particular box (or multiple boxes, if a document has multiple signatories) should have a much higher confidence than the remaining regions that survived the OCR and other image processing steps. The identified regions of the image within the identified bounding boxes are extracted (Step 260) for subsequent use in verification.

In some instances, a document may be determined to lack any signature at all after processing has been performed and failed to identify any portion of the document that has a sufficiently high likelihood of being a handwritten signature. In such a case, extraction server 125 may generate a message to user interface server 115, indicating this fact, which may also be forwarded in substantial part to either user computing device 110 (indicating to the user that there is an error and the document has not yet been signed) or to customer service computing device 120 (indicating that the customer service representative needs to contact a user, inform the user of the situation, and obtain a signed version).

FIGS. 3A-3F depict a sample document at different stages of a signature recognition process.

Figure 3A:
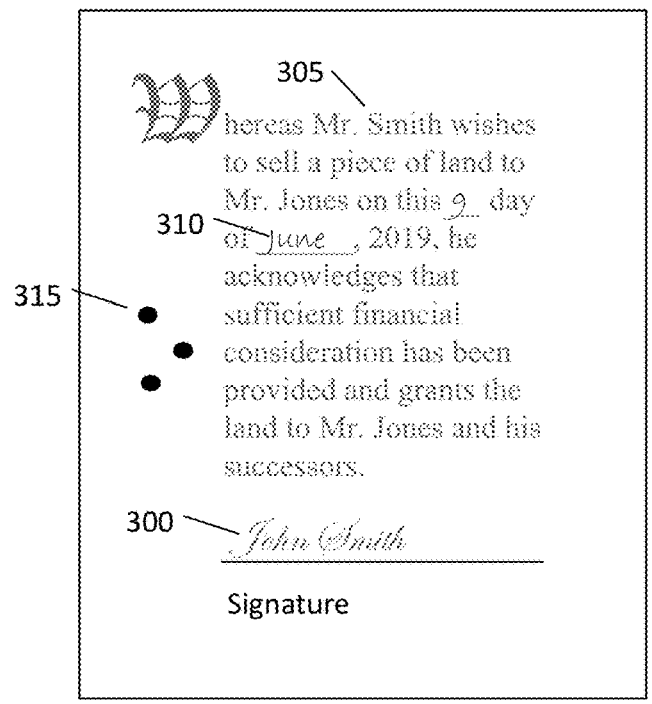

FIG. 3A depicts an original scanned document with a number of features, including signature 300, various typed words 305, handwritten printed characters 310, and dust or other speckling 315 picked up by a scanner. For example, the document might read: "Whereas Mr. Smith wishes to sell a piece of land to Mr. Jones on this $9^{th}$ day of June, 2019, he acknowledges that sufficient financial consideration has been provided and grants the land to Mr. Jones and his successors" and be signed on a line beneath the printed text.

Figure 3B:
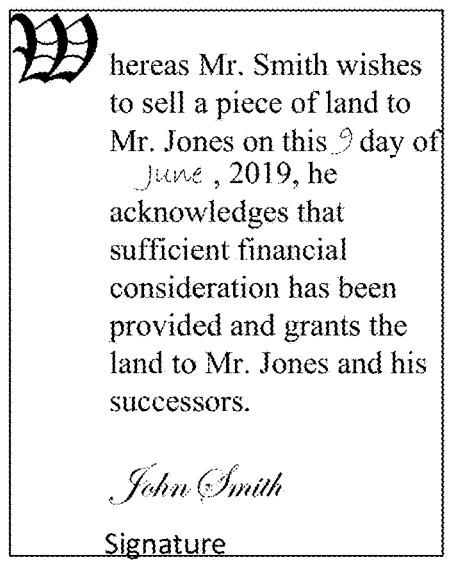

FIG. 3B depicts the same document as FIG. 3A, after the image has been grayscaled, thresholded, binarized, despeckled, and had lines removed via convolution matrix. Speckling 315 is no longer present, nor is the line on which the signature 300 was made, and any text that was not fully black (or picked up as lighter by the scanner) has been made black via the binarization/thresholding.

Figures 3C, 3D:
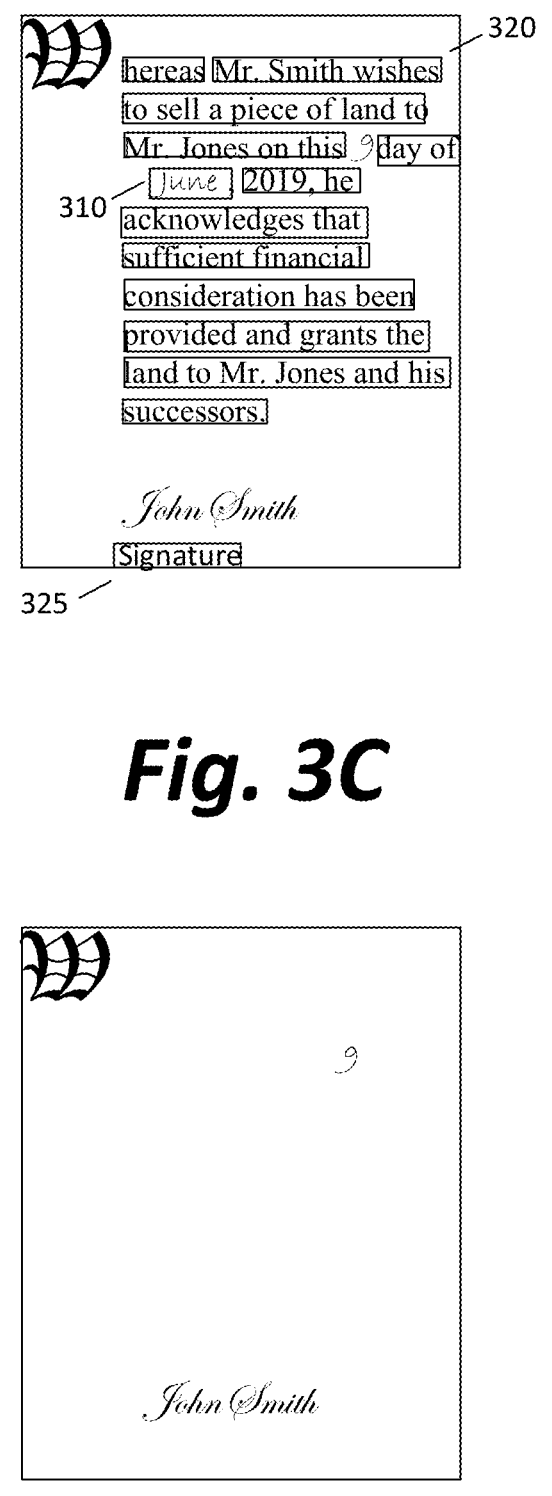

FIG. 3C depicts the bounding boxes 320 around words noted by OCR, including one around anchor word 325 and one around a handwritten character 310.

FIG. 3D depicts the document after non-anchor boxes noted by OCR have been removed.

Figure 3E:
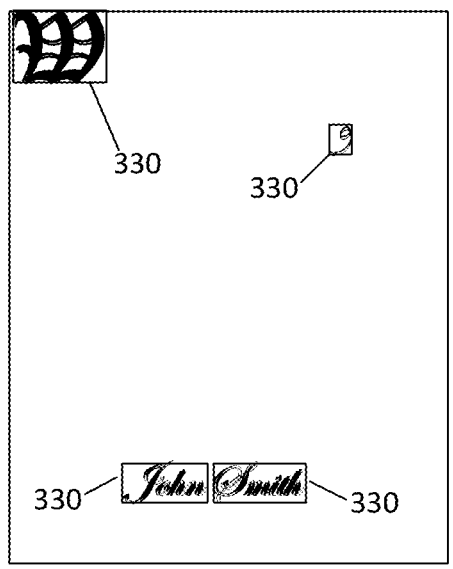

FIG. 3E depicts the connected regions of text 330 that result after the image in FIG. 3D has been dilated and the connected pixel group identification process is complete.

Figure 3F:
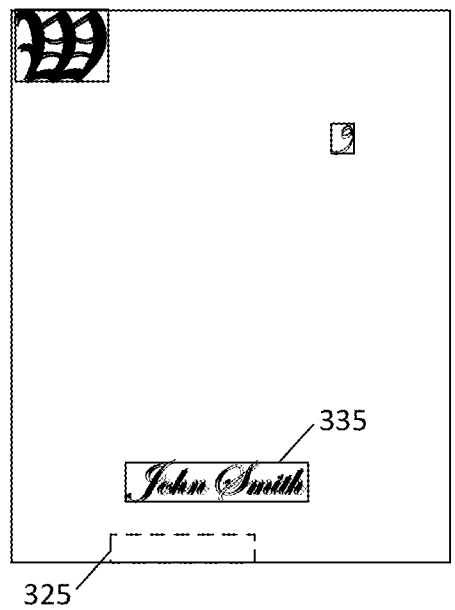

FIG. 3F depicts the two connected regions identified in FIG. 3E connected into a single region 335 due to their proximity with one another. Based on one or more of proximity to the known location of anchor word 325, the length and relatively low aspect ratio of the bounding box, the low density of pixels within the bounding box, and/or input from a machine learning analysis of the contents, the bounding box 335 around signature 300 is clearly the best candidate for the signature, and is extracted.

Figure 4:
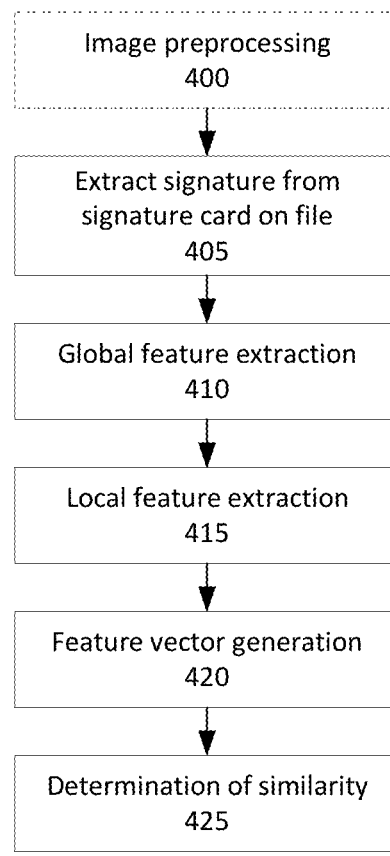
FIG. 4 depicts a method of verifying that an extracted signature purported to be by a particular signer is close to the signature of signer on file, according to methods disclosed herein.

FIG. 4 depicts a method of verifying that an extracted signature purported to be by a particular signer was actually made by that signer.

In a preferred embodiment, the verification algorithm receives a binarized signature that is contained in a minimal bounding box, as returned by the method for extraction described above. In some embodiments, a signature may be provided which was the result of a different extraction process, and must undergo preprocessing (Step 400), or may undergo additional preprocessing not performed by the extraction algorithm. Preprocessing may include, as necessary, conversion of received image data to grayscale, despeckling the image data, removing horizontal and vertical lines from the data via convolution matrix, cropping the image to remove whitespace, rotating the image if the signature is aligned at an angle rather than horizontal, via a deskewing algorithm, and binarization.

One or more known examples copies of the signature (such as one made on a bank card, or an initial sign-up form) may be retrieved from a database (Step 405) or otherwise loaded or inserted into the system for analysis.

Next, both the purported signature and the known signature may undergo global feature extraction (Step 410). In a preferred embodiment, each image is divided into a series of smaller tiles (for example, 3 pixel by 3 pixel tiles) and these sets of tiles undergo wave extraction via the SIFT and SURF algorithm. A Pearson correlation coefficient is determined from the extracted wave features to allow determination of a p-value that the two signatures are similar.

Next, both the purported signature and the known signature may also undergo local feature extraction (Step 415).

Local feature analyses may include any of histogram of oriented gradients, a structural similarity analysis, a cosine similarity metric, and/or an energy-entropy comparison between the two images.

A histogram of oriented gradients (HoG) analysis involves generating two HoG vectors for each image, determining the dot product of the two vectors, determining the Frobenius norm of the two vectors, and determining a ratio between the dot product and Frobenius norm.

A cosine similarity metric may involve dividing the image into a fixed number of tiles, calculating the X- and Y-axis centroids of each tile of the two tilesets, and generating two vectors, each with the X- and Y-coordinates of each of the centroids of each image. A similarity can be determined based on the ratio of the dot product to the Frobenius norm of these two centroid vectors.

An energy-entropy metric may compare the total entropy of equivalent tiles from each image (equal to $-p \log p$, where p is the pixel density within the tile) and the total energy of equivalent tiles (equal to the sum of squares of all pixel intensities, divided by the area of the tile).

The values returned by various aspects of the global and local feature extraction may be combined into a single feature vector (Step 420) in order to allow processing of that vector by one or more machine learning techniques to return a final likelihood of similarity of the signatures.

In a preferred embodiment, the determination is made based on a trained linear regression (Step 425) of the feature vector.

Figure 5:
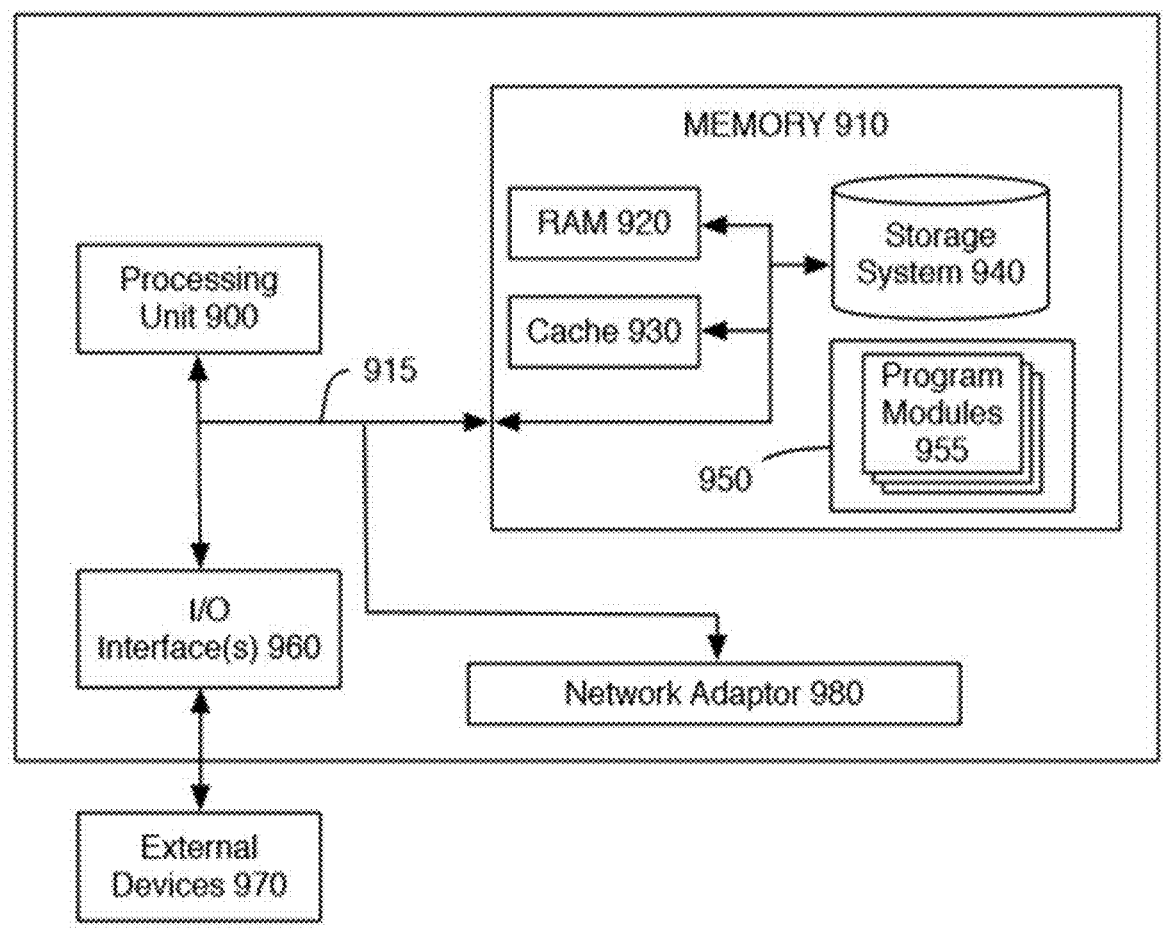
FIG. 5 is a high-level block diagram of a representative computing device that may be utilized to implement various features and processes described herein.

The software-implemented methods described above do not generally rely on the use of any particular specialized computing devices, as opposed to standard desktop computers and/or web servers. For the purpose of illustrating possible such computing devices, FIG. 5 is a high-level block diagram of a representative computing device that may be utilized to implement various features and processes described herein, including, for example, those of computing devices 110, 115, 120, 125, 135, and/or 140. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for extraction and verification of handwritten signatures, comprising:
   one or more processors;
   non-transitory memory comprising instructions that, when executed by the one or more processors, cause the one or more processors to:
   receive a transmission comprising a digital image of a document comprising a handwritten signature;
   perform optical character recognition on the digital image, and remove all words identified by the optical character recognition, if any, to obtain a first modified image;
   perform a dilating transformation via convolution matrix on the first modified image to obtain a second modified image;
   determine a plurality of regions of connected markings that remain in the second modified image;
   based at least in part on a pixel density of or a proximity to an anchor substring of each of the plurality of regions, determine that one or more regions of the plurality of regions each contain any handwritten signature;
   extract first image data of the one or more regions, each containing any handwritten signature, from the digital image;
   retrieve second image data of a confirmed example signature for a purported signer of each handwritten signature of the one or more regions; and
   based on a comparison of the first image data with the second image data, forward a determination of whether the first image data and second image data represent signatures that are similar.

2. The system of claim 1, wherein the comparison of the first image data with the second image data comprises:
   subsequent to extracting the first image data and retrieving the second image data, create a feature vector that incorporates a plurality of similarity metrics between the first and second image data; and
   passing the feature vector to a linear regression model to estimate a likelihood that that the first image data and second image data are similar to each other, wherein the determination of whether the first image data and second image data are similar is made based on the likelihood exceeding a predetermined threshold.

3. The system of claim 2, wherein the plurality of similarity metrics comprises a histogram of oriented gradients.

4. The system of claim 2, wherein the plurality of similarity metrics comprises a cosine similarity metric.

5. The system of claim 2, wherein the plurality of similarity metrics comprises an energy-entropy comparison.

6. The system of claim 2, wherein the plurality of similarity metrics comprises a Pearson coefficient between sets of extracted waveforms from tiles.

7. The system of claim 1, wherein the determination that one or more regions of the plurality of regions each contain any handwritten signature is additionally based on a ratio of height to width of each region.

8. The system of claim 1, wherein the determination that one or more regions of the plurality of regions each contain any handwritten signature is additionally based on a neural network classifier of the contents of each region that determines a relative confidence that the region contains handwritten text compared to typewritten text.

9. The system of claim 1, wherein the instructions, when executed by the one or more processors, further cause the one or more processors to:
   receive a second digital image of a second document that does not comprise any handwritten signature;
   automatically determine that no handwritten signature is present; and
   generate a message to a source of the second digital image indicating that the second document must be signed before further processing.

10. A method for extracting a handwritten signature from a digital image, comprising:
    receiving a transmission comprising a digital image of a document comprising a handwritten signature;
    removing a subset of words from the digital image identified via optical character recognition to obtain a first modified image;
    performing a dilating transformation via convolution matrix on the first modified image to obtain a second modified image;
    determining a plurality of regions of connected markings that remain in the second modified image;
    based at least in part on a pixel density of or a proximity to an anchor substring of each of the plurality of regions, determining that one or more regions of the plurality of regions each contain any handwritten signature; and
    extracting image data of the one or more regions, each containing any handwritten signature, from the digital image.

11. The system of claim 1, wherein the document is in a unknown format defined by an organization other than an organization operating the system, such that the system lacks access to any information regarding where a signature may be expected in the document before analysis of the document begins.

12. The system of claim 1, wherein, when the determination that one or more regions of the plurality of regions each contain any handwritten signature is based at least in part on a pixel density each of the plurality of regions, the determination comprises comparing pixel densities of each of the regions to each other in order to prioritize regions with the least density compared to the other regions.

13. The method of claim 10, wherein the determination that one or more regions of the plurality of regions each contain an handwritten signature is additionally based on a ratio of height to width of each region.

14. The method of claim 10, wherein the determination that one or more regions of the plurality of regions each contain any handwritten signature is additionally based on a neural network classifier of the contents of each region that determines a relative confidence that the region contains handwritten text compared to typewritten text.

15. The method of claim 10, further comprising:
receiving a second digital image of a second document that does not comprise any handwritten signature;
automatically determining that no handwritten signature is present; and
generating a message to a source of the second digital image indicating that the second document must be signed before further processing.

16. A method for verifying that a handwritten signature was made by a given human user, comprising:
receiving first image data comprising a purported signature of an individual;
retrieving second image data comprising a known signature of an individual;
extracting at least one global feature from the first and second image data to obtain at least one global similarity metric between the first and second image data;
extracting a plurality of local features from the first and second image data to obtain a plurality of local similarity metrics between the first and second image data;
creating a feature vector that incorporates the global and local similarity metrics between the first and second image data; and
passing the feature vector to a linear regression model to estimate a likelihood that that the first image data and second image data are similar, wherein determining whether the first image data and second image are similar is made based on the likelihood exceeding a predetermined threshold.

17. The method of claim 16, wherein the plurality of local similarity metrics comprises a histogram of oriented gradients.

18. The method of claim 16, wherein the plurality of local similarity metrics comprises a cosine similarity metric.

19. The method of claim 16, wherein the plurality of local similarity metrics comprises an energy-entropy comparison.

20. The method of claim 16, wherein the at least one global similarity metric comprises a Pearson coefficient between sets of extracted waveforms from tiles.

* * * * *